United States Patent [19]

Schlecht

[11] Patent Number: 5,183,676
[45] Date of Patent: Feb. 2, 1993

[54] PROCESS FOR COUNTERCURRENT EXTRACTION OF COFFEE

[75] Inventor: Klaus Schlecht, Orbe, Switzerland
[73] Assignee: Nestec S.A., Vevey, Switzerland
[21] Appl. No.: 770,584
[22] Filed: Oct. 3, 1991

[30] Foreign Application Priority Data

Oct. 24, 1990 [EP] European Pat. Off. ........ 90120388.5

[51] Int. Cl.⁵ .............................................. A23F 5/26
[52] U.S. Cl. .................................... 426/434; 426/432
[58] Field of Search ................................ 426/434, 432

[56] References Cited

U.S. PATENT DOCUMENTS 3,720,518  3/1973  Galdo et al. ........................ 426/434
4,129,665  12/1978  Clark ................................. 426/432

Primary Examiner—Joseph Golian
Attorney, Agent, or Firm—Vogt & O'Donnell

[57] ABSTRACT

Two flash evaporation steps are incorporated into a countercurrent extraction process employed to extract coffee. One flash evaporation step is performed upon a first extract obtained from an extraction cell having a temperature of above 150° C., the flash evaporation being performed at a temperature reduced from 150° C. The second flash evaporation step is performed upon a second extract obtained from an extraction cell positioned at least one cell downstream in the series from the cell from which the first extract was obtained, the second flash evaporation being carried out at a temperature higher than the temperature of the first flash evaporation and the product thereof being introduced to a further downstream extraction cell.

6 Claims, 1 Drawing Sheet

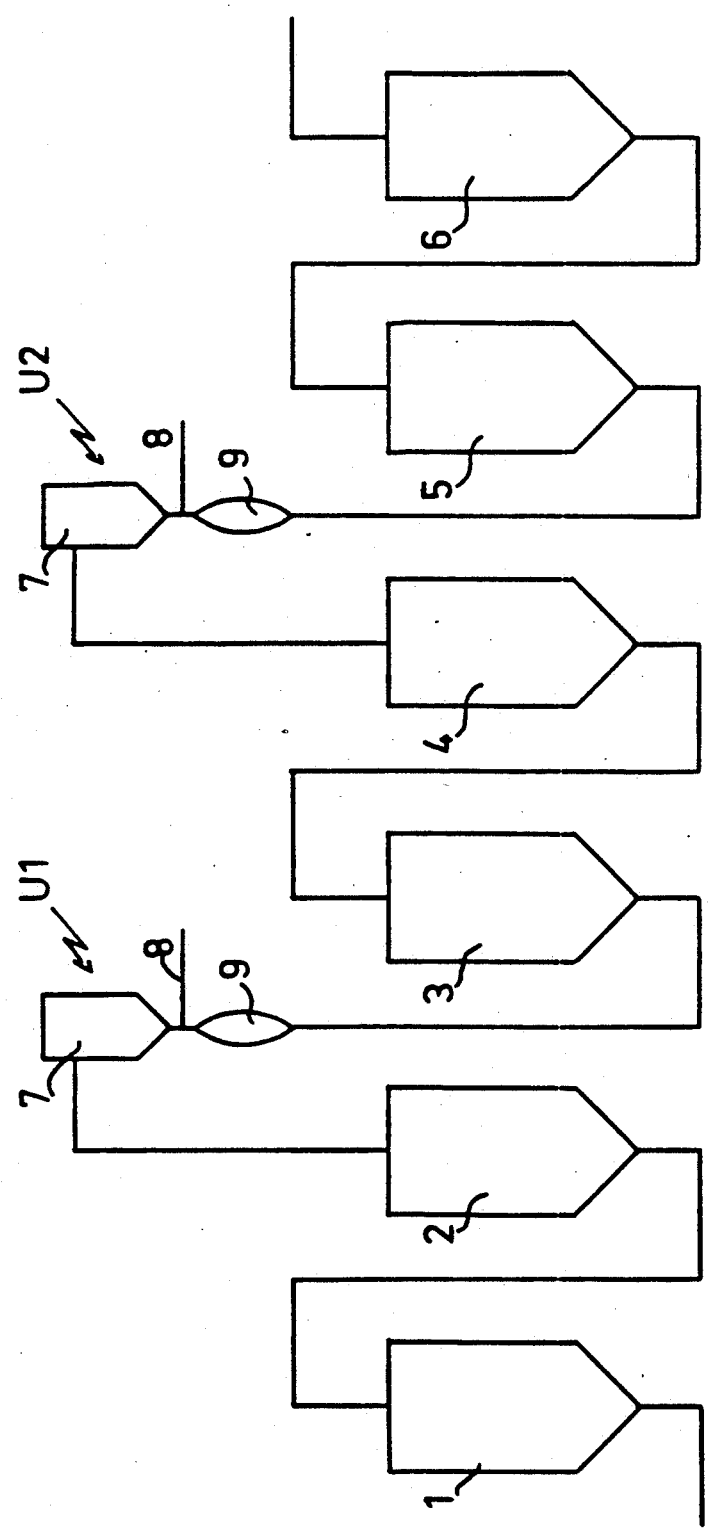
Figure unique

PROCESS FOR COUNTERCURRENT EXTRACTION OF COFFEE

BACKGROUND OF THE INVENTION

This invention relates to a process and an apparatus for the production of soluble instant coffee in powder form.

Soluble coffee powder is conventionally produced by freeze-drying or spray-drying after evaporation of a coffee extract obtained by the percolation of an extraction liquid through cells filled with ground roasted coffee (Sivetz, Coffee Processing Technology, Volume 1, pages 262, 263, AVI, 1963).

Extraction is carried out in countercurrent fashion, i.e., the water under pressure at a temperature of 150° to 180° C. is introduced into the cell containing the batch of ground roasted coffee which has been most intensively extracted (having undergone N extractions) at the bottom of that, and then the liquid extract of this extraction cell is passed through the extraction cell containing the batch of coffee which has been extracted (N−1) times, and so, on until the liquid extract passes through the cell which has just been filled with fresh, ground roasted coffee and the final extract leaves the last cell at a temperature on the order of 100° C.

In such countercurrent extraction, the most intensively extracted coffee is thus subjected to the highest temperature while the fresh coffee is subjected to the lowest temperature.

A distinction is normally drawn between the hot cells, which contain the most intensively extracted coffee, and the cold cells, which contain the least intensively extracted coffee.

After each extraction cycle, the cell containing the most intensively extracted coffee is emptied, filled with fresh coffee and, after the cells have been suitably interconnected, another extraction cycle begins.

It is known that, the higher the extraction temperature, the higher the yield. On the other hand, however, the use of a high temperature results in hydrolysis phenomena which produce organoleptically disagreeable compounds.

Thus, the extract produced in the hot cells is typically charged with compounds which give rise in the final extract to the formation of a soluble coffee powder which, after redissolution in hot water, has a marked taste of hydrolysis and caramel.

It has thus been proposed, as for example in U.S. Pat. No. 4,129,665, to extract the coffee by partly evaporating the extract from the hot cells before it is reintroduced into the cold cells, the evaporated extract having a temperature above 120° C. More particularly, evaporation is carried out in an expansion evaporator consisting of a pressure reducing unit followed by a flash evaporator.

In addition, in this process, at least as much extraction liquid as that which has been evaporated is added to the extract which has undergone evaporation.

In this process, an improvement in the end product is clearly obtained because the tastes of hydrolysis and caramel are distinctly reduced.

In spite of this result, however, there is a simultaneous reduction in the strength of the organoleptically desirable compounds, which is all the more marked if the treated coffee has been weakly roasted.

One way of overcoming this disadvantage may be to reduce the effect of the process by increasing the flash evaporation temperature although, in this case, the compounds to be suppressed are less effectively eliminated.

Accordingly, the object of the process according to the invention is to enable the organoleptically troublesome compounds to be eliminated without a simultaneous reduction in taste.

In addition, in the prior art, solids, such as polysaccharides or proteins, are also present in suspension, even after filtration of the final extract, which tends to eliminate the solid particles which may have been entrained from the coffee suspension, and have to be eliminated to enable a coffee powder which dissolves perfectly without any solids appearing in the cup to be obtained after evaporation and freeze-drying or spray-drying of the extract.

The suspended solids are normally eliminated by centrifugation, the sediment obtained then being decanted, the supernatant decantation liquid being reintroduced into the final filtered extract while the solid residue obtained is eliminated.

The main disadvantage of this process is that it produces a sediment which has to be retreated by decantation and which is not easy to handle.

In addition, the suspended solids cannot always be satisfactorily eliminated by centrifugation.

Accordingly, another object of the present invention is to provide a process which in addition, reduces the insoluble fraction present in the final extract.

SUMMARY OF THE INVENTION

Accordingly, the present invention relates to a process for the production of soluble instant coffee powder in which an extraction liquid is percolated in countercurrent fashion through cells filled with ground roasted coffee, the final extract then being converted into powder form, in which an extract produced in one or more hot cells at a temperature above 150° C. is subjected to a first flash evaporation, the extract produced then being reintroduced into the extraction circuit to undergo a second flash evaporation separated from the first by at least one intermediate extraction cell, the product of this evaporation then being reintroduced into the cold cells of the extraction circuit.

The present invention also relates to a process of the above type in which extraction liquid is added after the second evaporation and before reintroduction into the cold cells.

Other features and advantages of the invention will become apparent from the following description in conjunction with the accompanying drawings which are provided solely by way of example and which illustrate an apparatus for carrying out the process according to the invention.

The process according to the invention essentially comprises eliminating the undesirable constituents immediately after their production by subjecting an extract having a temperature above 150° C., produced by the hottest cells, to flash evaporation at a temperature reduced from 150° C. and then reintroducing this extract into the extraction circuit.

A second flash evaporation, separated from the first by at least one extraction cell, is then carried out, the product of this second operation being reintroduced into the extraction circuit. Hence, to introduce the second extract evaporation product in the circuit, the extract to be evaporated is obtained from an extraction cell prior to a last downstream cell in the extraction cell series circuit.

The first evaporation is preferably carried out at relatively low temperature to obtain a maximal effect while the second evaporation is carried out at a higher temperature to eliminate the last undesirable compounds while, at the same time, avoiding any loss of organoleptically desirable elements.

Thus, the first evaporation is preferably carried out at 60° C. and the second evaporation at 80° C.

The temperature of the first evaporation enables the hydrolysis flavours produced to be eliminated to a considerable extent.

In addition, the marked drop in temperature of the extract, which falls from more than 150° C. to 60° C., promotes good sedimentation of the insoluble fraction which will then be retained in the intermediate cells.

The temperature of the second evaporation is considered to be an optimum between satisfactory elimination of the undesirable flavours and minimal reduction of the strength of the coffee.

By virtue of this process, satisfactory elimination of the organoleptically troublesome compounds is thus obtained without any reduction in taste.

In addition, the first evaporation carried out immediately after the hottest cells produces a reduction in the volume of extract percolating through the following cells.

This reduction in volume and hence in flow rate is accompanied by a reduction in the speed of the extract through the following cells which thus function as filters by retaining suspended solids which may have been entrained from the hot cells.

Accordingly, this results in a reduction in the insoluble fraction in the final extract.

Unfortunately, the two successive evaporations produce a very significant reduction in the flow rate through the cold extraction cells. This adversely affects extraction which may then become inadequate in the context of an industrial process.

To overcome this disadvantage, it is advisable to increase the flow rate downstream of the second evaporation in the cold cells in order to increase the volume of water in contact with the coffee to be extracted in the cold cells and hence to increase extraction.

Finally, the quality of the end product may be modulated by adding a more or less large quantity of water after the first evaporation.

By increasing the flow rate in the intermediate cells and hence the percolation rate, the addition of water clearly reduces the diminution of the insoluble fraction in the end product because the filtration effect in the intermediate cells is reduced.

In addition, the treated liquid extract has to be reheated after each evaporation to return its temperature to the desired extraction temperature.

BRIEF DESCRIPTION OF THE DRAWINGS

The drawing FIGURE illustrates a countercurrent extraction apparatus system having evaporation devices which enable practice of the process of the present invention.

DETAILED DESCRIPTION OF THE INVENTION

As can be seen from the sole FIGURE, an apparatus for the extraction of coffee consists of several extraction cells functioning in series. Each extraction cell is formed by a column of which the lower part is connected to the upper part of the preceding column and of which the upper part is connected to the lower part of the following column.

An extraction apparatus generally consists of four to eight extraction cells and, preferably, six extraction cells.

The cell 1 contains the most intensively extracted coffee while the cell 6 contains the least intensively extracted coffee, the extraction level decreasing from cell 1 towards cell 6.

The extraction liquid, which may be formed by water under pressure at a temperature of 150° C. to 180° C., arrives at the bottom of the cell 1, passes upwards through this cell, becoming charged with soluble product in the process, leaves the cell 1 at its upper end and passes successively through each of the cells until it passes through the cell 6 which is the last cell and which contains fresh ground roasted coffee.

Accordingly, the extract issuing from the cell 6 is the final extract which is subsequently filtered and optionally centrifuged, then evaporated and finally converted into powder form by freeze-drying or spray-drying.

To carry out the process according to the invention, the extraction cells are divided into a group of hot cells, where the temperature may be above 150° C., a group of intermediate cells where the temperature may be above 130° C. and a group of cold cells.

In the preferred embodiment illustrated in the sole FIGURE, the hot cells are the cells 1 and 2, the intermediate cells are the cells 3 and 4 and the cold cells are the cells 5 and 6.

A first intercell treatment unit U1 is arranged between the group of hot cells and the group of intermediate cells in the circuit of the liquid extract.

Similarly, a second intercell treatment U2 is arranged between the group of intermediate cells and the group of cold cells.

Each intercell treatment unit U1, U2 consists of an expansion evaporator 7 comprising a pressure reducing unit followed by a flash evaporator.

Provided at the exit of the expansion evaporator is a source 8 of extraction liquid for compensating all or part of the loss of liquid produced by evaporation.

Finally, a reheater 9 for the treated extract is provided downstream of the source 8.

EXAMPLES

The process according to the invention is illustrated by the following Examples.

EXAMPLE 1

This Example illustrates the influence of the second evaporation, carried out by the second intercell treatment unit U2, on the quality of the product obtained.

A series of tests was carried out with an extraction battery consisting of two hot cells, two intermediate cells and two cold cells. Water at 180° C. was introduced into the most intensively extracted cell 1 and a liquid extract at 172° C. issued from the cell 2 to be treated by a first intercell treatment unit U1.

In this unit U1, the flash evaporation temperature was fixed at 60° C.

No liquid was added to the treated liquid extract issuing from the unit U1 and, after reheating to 160° C., the liquid extract was reintroduced into the cell 3 and was discharged from the cell 4 at 150° C.

The liquid extract was then treated in the second intercell treatment unit U2 and was reheated to a temperature of 100° C. before reintroduction into the cold cell 5.

Four tests were carried out at four different evaporation temperatures in the unit U2. The results are set out in the following Table:

| Flash evaporation temperature in unit U2 (°C.) | Quantity of water evaporated (kg) per kg ground roasted coffee | Quantity of water added (kg) per kg ground roasted coffee |
| --- | --- | --- |
| 60 | 0.31 | 1.7 |
| 70 | 0.22 | 1.6 |
| 80 | 0.18 | 1.5 |
| 90 | 0.11 | 1.4 |

There is thus a reduction in the strength of the taste of the coffee accompanied by an increase in the purity of the aroma with decreasing evaporation temperature. A temperature of 70° C. to 80° C. was finally preferred as constituting a satisfactory compromise.

EXAMPLE 2

This Example illustrates the influence of the number of intermediate cells on the one hand on the quality of the coffee and, on the other hand, on the insoluble fraction in the final extract.

In this Example, all the tests were carried out with an extraction liquid flowing in at 180° C. and then entering the first intermediate cell at 140° C. and the first cold cell at 105° C. The temperature of the first evaporation in the unit U1 is 60° C. while the temperature of the second evaporation in the unit U2 is 80° C. No liquid is added to the extract after the first unit U1 whereas 2 kg water per kg roasted coffee are added to the extract issuing from the second unit U2.

The various tests carried out are summarized in the following Table:

| Number of intermediate cells | Insoluble fraction in the final extract (%) | Remarks |
| --- | --- | --- |
| 3 | 0.7 | Very clear coffee, very mild and slightly dry taste |
| 2 | 1.2 | Clear coffee, mild and full taste |
| 1 | 2.1 | Clouded coffee, slightly bitter taste |

The optimum solution is thus to use two intermediate cells.

EXAMPLE 3

This Example illustrates the influence of the addition of water after the first evaporation in the unit U1 on the final extraction and on the quality of the end product.

All the tests were carried out at a second evaporation temperature in the unit U2 of 80° C. by adding 2 kg water per kg roasted coffee after the unit U2, the extraction apparatus comprising two hot cells, two intermediate cells and two cold cells, the extraction yield being identical in all the tests.

| Addition of water after the unit U1 (kg water per kg ground roast coffee) | Insoluble fraction (%) |
| --- | --- |
| 0 | 2.1 |
| 1.5 | 2.2 |
| 2.5 | 2.5 |

An increase in the insoluble fraction is thus observed, being attributable to a reduction in the filtration effect in the intermediate cells. In addition, the quality of the end product deteriorates, becoming more bitter and harder. Accordingly, it is preferred not to add water after the first evaporation.

However, it is clear that this parameter enables the quality of the end product to be modulated according to the taste which it is desired to obtain.

We claim:

1. In a process for extracting roast and ground coffee material in a countercurrent extraction apparatus having a plurality of cells interconnected in series, wherein an extraction liquid is passed downstream from one cell to a next adjacently positioned cell in the series and through the coffee material contained in each cell in countercurrent fashion to obtain an extract from the coffee material, and wherein extract is obtained from at least one cell in the series and is subjected to evaporation at a temperature reduced from a temperature employed for extraction in the extraction cells, the improvements comprising:

obtaining a first extract having a temperature above 150° C. from an extraction cell, flash evaporating the first extract at a temperature reduced from 150° C. to obtain a first extract product, heating the first extract product to a temperature sufficient for extraction of coffee material contained in a downstream extraction cell and introducing the heated extract product into the downstream cell adjacent the cell in the series from which the first extract was obtained; and obtaining a second extract from an extraction cell which is positioned in the series at least one cell downstream from the cell from which the first extract was obtained and which is positioned prior to a last downstream cell in the series, flash evaporating the second extract to obtain a second extract product, heating the second extract product to a temperature sufficient for extraction of coffee material contained in a downstream extraction cell and introducing the heated second extract product into the downstream cell adjacent the cell in the series from which the second extract was obtained; and wherein the second flash evaporation is carried out at a temperature higher than the first flash evaporation.

2. A process according to claim 1 wherein the second flash evaporation is carried out at a temperature of from 70° C. to 80° C.

3. A process according to claim 1 further comprising increasing the flow rate of extract through the extraction cells downstream of the cell from which the second extract was obtained.

4. A process according to claim 1 further comprising adding extraction liquid to the second extract product.

5. A process according to claim 1 wherein the second extract is obtained from an extraction cell which is positioned two cells downstream from the extraction cell from which the first extract was obtained.

6. A process according to claim 1 wherein the extraction cells comprise a group of hot cells and a group of cold cells and wherein the first flash evaporation is carried out upon extract obtained from a hot cell and the second extract product is introduced into a cold cell.

* * * * *

UNITED STATES PATENT AND TRADEMARK OFFICE
CERTIFICATE OF CORRECTION

PATENT NO. : 5,183,676
DATED : February 2, 1993
INVENTOR(S) : Klaus SCHLECHT

Page 1 of 2

It is certified that error appears in the above-identified patent and that said Letters Patent is hereby corrected as shown below:

Column 1, line 16, delete "the".

Column 1, line 20, after "that", and before the comma, insert --cell--.

Column 1, line 23, delete the comma after "so" and then insert a comma after "on".

Column 1, line 24, delete the comma after "fresh".

UNITED STATES PATENT AND TRADEMARK OFFICE
CERTIFICATE OF CORRECTION

PATENT NO. : 5,183,676
DATED : February 2, 1993
INVENTOR(S) : Klaus SCHLECHT

It is certified that error appears in the above-identified patent and that said Letters Patent is hereby corrected as shown below:

Column 1, line 25, insert a comma after "coffee".

Column 2, line 29, delete "in addition,".

Column 2, between lines 55 and 56, insert --DETAILED DESCRIPTION OF THE INVENTION--.

Signed and Sealed this

Thirtieth Day of November, 1993

*Attest:*

BRUCE LEHMAN

*Attesting Officer*  *Commissioner of Patents and Trademarks*